United States Patent Office 2,756,175
Patented July 24, 1956

2,756,175

FUNGICIDAL COMPOSITIONS COMPRISING COPPER-8-QUINOLINOLATE SOLUBILIZED WITH HEAVY METAL SALTS OF ALKYL PHOSPHORIC ACID ESTERS

Herman B. Goldstein, Cranston, R. I., and Mark W. Pollock and Ernst Zerner, New York, N. Y., assignors to Sun Chemical Corporation, Long Island City, N. Y., a corporation of Delaware No Drawing. Application July 2, 1952,
Serial No. 296,958

8 Claims. (Cl. 167—33)

The present invention relates to compositions for imparting fungicidal properties to textiles and like cellulosic materials. More particularly, the present invention relates to fungicidal compositions containing copper-8-quinolinolate which compositions are soluble in liquid organic media.

Copper-8-quinolinolate, the copper salt of 8-hydroxyquinoline, is well known to be an effective fungicide and has obtained widespread use in the textile field as a mildew-proofing agent and preservative for textile materials, particularly for such materials which are destined for use out-of-doors and which may be subject to all manner of weather conditions. However, this compound is substantially insoluble in water and in the organic media normally employed in the treatment of textiles, and for practical operations has been generally utilized in the form of a dispersion thereof in a liquid carrier containing suitable binder materials which, upon application to textile materials and upon subsequent drying and curing operations, bind the copper-8-quinolinolate to the fibers of the materials treated. While such compositions are satisfactory for many purposes, their use is also often undesirable since the binder materials used therein generally have a tendency to stiffen the fabrics treated therewith or to cause excess weighting thereof. Furthermore, even when such copper-8-quinolinoate dispersions are ground to an extremely fine particle size, the fungicide tends to deposit only on the surface of the treated textile and does not penetrate the innermost fibers. This is particularly true when very heavy or tightly woven fabrics are being treated. This localization of the copper-8-quinolinolate on the surface of the treated fabrics generally results in an excessive tendency to "crock," that is, to rub off, and will produce greatly reduced mildew protection. In many cases, therefore, it would be preferable if the copper-8-quinolinolate could be incorporated into textile fibers directly, that is, in the form of a true solution and without the use of resinous binder materials, and in such form as to be substantially completely resistant to removal therefrom by rubbing or other mechanical abrading actions and also resistant to removal by water such as in normal washing operations or as might occur under outdoor weathering conditions.

Therefore, one object of the present invention is to provide a fungicidal composition containing copper-8-quinolinolate which is adapted to be utilized in the treatment of textile materials in the form of a solution thereof to impart highly durable fungicidal and preservative properties thereto.

Another object of the present invention is to provide a fungicidal composition containing copper-8-quinolinolate, which composition is insoluble in water but is soluble in the organic media commonly utilized in the treatment of textile materials.

Another object of the present invention is to provide processes for preparing soluble fungicidal compositions containing copper-8-quinolinolate.

Other objects of the present invention will be apparent from the following description and appended claims.

In accordance with the present invention, a fungicidal composition containing copper-8-quinolinolate which is soluble in organic media but is insoluble in water and which is adapted to be utilized in the treatment of cellulosic textile materials to impart durable fungicidal properties thereto, may be prepared by heating copper-8-quinolinolate in a suitable organic solvent with a heavy metal salt of a material of the group consisting of the monoalkyl acid esters and the dialkyl acid esters of the phosphoric acids, such as orthophosphoric acid and pyrophosphoric acid, and of mixtures of such esters.

We have also found that the monoalkyl acid esters and the dialkyl acid esters of the phosphoric acids are, of themselves, solubilizers for copper-8-quinolinolate in organic media such as the aliphatic and aromatic hydrocarbon solvents. However, solutions of copper-8-quinolinolate in organic media in which the said acid esters of the phosphoric acids are employed as the solubilizers are strongly acidic and are, therefore, completely impractical for use in the treatment of cellulosic textile materials due to the deteriorating effect of the acidity of the impregnating solution on the treated fabric, even though the treated fabric may subsequently be neutralized. Attempts at neutralization of such solutions only result in the precipitation of the copper-8-quinolinolate, thus destroying the usefulness of these compositions as textile treating agents. With the use of the heavy metal salts of these acid phosphates as the solubilizers for copper-8-quinolinolate in organic solvents, mineral acidity of solutions containing the solubilized copper-8-quinolinolate is completely avoided. The present invention, therefore provides textile treating solutions of copper-8-quinolinolate in organic solvents which solutions are substantially neutral, have no adverse effect on fabrics treated therewith, and which require no subsequent treatment of the fabric such as the neutralization treatment required when the fabrics are treated with solutions of an acid character. In view of the fact that the attempts at neutralization of solutions of copper-8-quinolinolate containing the acid phosphates as solubilizers prove futile as far as obtaining neutralized solutions of copper-8-quinolinolate in organic media was concerned, it was entirely unexpected, nor could it be predicted, that the neutral heavy metal salts of the said acid phosphates would provide completely solubilized copper-8-quinolinolate compositions. What is even more surprising is the fact that the heavy metal salts of the said acid phosphates display, in general, a greater solubilizing action upon copper-8-quinolinolate in organic media than do the corresponding acid phosphates themselves.

As examples of the monoalkyl and dialkyl acid esters of the phosphoric acids the heavy metal salts of which may be employed in the practice of the present invention there may be mentioned monoisoamyl acid orthophosphate, amyl octyl acid orthophosphate, ethyl lauryl acid orthophosphate, ethyl oleyl acid orthophosphate and dioctyl acid pyrophosphate. For the purposes of the present invention, the said compounds may comprise mixtures of the monoalkyl and the dialkyl acid esters of the phosphoric acids. Thus, mono dioctyl acid orthophosphate, which is a commercial product containing approximately 42% of monooctyl acid orthophosphate, approximately 53% of dioctyl acid orthophosphate and approximately 5% of trioctyl acid orthophosphate and of free phosphoric acid, is also suitable for use in the present invention. Since the heavy metal salts of both the monoalkyl acid esters and of the dialkyl acid esters of the phosphoric acids are suitable individually for carrying out the present invention, the ratio of the monoalkyl ester to the dialkyl ester in those mixtures of the monoalkyl and of the dialkyl esters, which are employed in the form of the heavy metal salts thereof is immaterial as far as the accomplishment of the desired result is concerned. It has been found that the heavy metal salts of substantially any combination of the above described esters of the phosphoric acids may be employed in carrying out the present invention.

Generally any of the heavy metal salts of the monoalkyl and of the dialkyl acid esters of the phosphoric acids may be employed in preparing the compositions of the present invention. Suitable metal salts of the said phosphoric acid esters which may be utilized are the salts of nickel, zinc, copper, lead, iron, cobalt, manganese and chromium, for example. It has also been found that the aluminum salts of the aforementioned esters of the phosphoric acids may also be employed in preparing the compositions of the present invention. Of these materials, it is preferred to employ the nickel salts since the compositions comprising these salts and copper-8-quinolinolate are generally more highly soluble in organic media than are those in which the other metal salts of the above mentioned acid esters are employed, thus permitting greater concentrations of the fungicidal compositions in the organic media used as the solvent or carrier therefor. However, all of the compositions of the present invention have sufficient solubility in organic solvents to permit concentrations thereof in the textile treating baths which are adequate for imparting highly fungicidal and preservative properties to textile materials treated therewith.

In the treatment of textiles and the like, a treating bath comprising a solution of a fungicidal composition of the present invention in a suitable organic solvent or mixture of such solvents is prepared. Suitable solvents for such use include xylene, toluene, benzene, naphtha, mineral spirits, and the like, or mixtures of such solvents. The fabric to be treated is immersed in the treating bath, as by normal padding operations, for example, and is then usually passed through squeeze rolls to regulate the amount of pick-up of the impregnating composition by the fabric. The impregnated fabric is then dried by any suitable method commonly employed in the industry for such purpose.

The amount of fungicidal composition which should be present in the treating bath to impart effective fungicidal and mildew-resistant properties to textile materials treated therewith will depend upon the type of fabric which is to be treated, that is, upon the absorptive properties of the fabric to be treated, upon the concentration of the fungicidal composition in the treating bath, and upon the quantity of copper-8-quinolinolate employed in the particular fungicidal composition employed. For practical purposes, completely effective fungicidal properties are imparted to textile materials when such materials contain within their fibers from approximately 0.75 to 1.5% by weight of copper-8-quinolinolate based upon the dry weight of the fabric. Therefore, for best results, the concentration of the fungicidal composition in the treating bath should be such as to enable the pick-up by the fabric of such an amount of the said composition as to provide the equivalent of from approximately 0.75 to 1.5% by weight of copper-8-quinolinolate based on the dry weight of the fabric.

In preparing the fungicidal composition of the present invention, a heavy metal salt of an acid phosphate of the type hereinbefore described or an aluminum salt of such acid phosphate is formed in situ in an organic solvent which is to act as the azeotroping agent for the by-products formed during the salt forming reaction and as the diluent or solvent for the finished composition. When formation of the metal salt of the acid phosphate has been completed, copper-8-quinolinolate is then added thereto and the materials are heated until substantially complete solution of the copper-8-quinolinolate is obtained.

In carrying out this process, a monoalkyl or a dialkyl acid ester of orthophosphoric or pyrophosphoric acid, an organic solvent, and a metal supplying compound such as a heavy metal salt of acetic acid, for example, are charged to a vessel equipped for refluxing and for azeotropic distillation. The amount in which the metal supplying compound used in preparing the metal salts of the acid phosphates hereinbefore described, is to be employed in carrying out the process is usually determined by the amount of metal required to replace the available hydrogen atoms of the particular acid phosphates utilized. However, an excess of metal over that required to form salts with the acid esters of the phosphoric acids may sometimes be used to advantage. The mixture thus charged is then refluxed until a completely clear solution of the reaction materials in the solvent has been obtained, any water or acetic acid formed during the reaction being removed from the reaction mixture by azeotropic distillation. Heating is then discontinued to allow the addition of copper-8-quinolinolate to the reaction mixture and the whole is then again refluxed till substantially complete solution of the copper-8-quinolinolate has been obtained.

The following examples are illustrative of the preparation of the fungicidal compositions of the present invention. All parts given therein are given as parts by weight.

*Example 1*

60 parts of monodioctyl acid orthophosphate, 40 parts of nickel acetate, and 110 parts of xylene are charged to a reaction vessel equipped for refluxing and azeotropic distillation. The charged materials are heated to reflux temperature and refluxed till the reaction mixture becomes completely clear, the water and acetic acid formed during the reaction being removed from reaction mixture by azeotropic distillation. After the reaction mixture has become completely clear, heating is discontinued and 22 parts of copper-8-quinolinolate are added thereto. The mixture is again heated to boiling and maintained at such temperature till all of the copper-8-quinolinolate has entered into solution. There is thus obtained a clear, dark green solution of a composition capable of imparting highly effective fungicidal properties to textile materials, the said solution containing approximately 9.5% by weight of copper-8-quinolinolate based on the weight of the solution.

A satisfactory bath for treating textile materials may be prepared by diluting the solution obtained above with xylene, Stoddard solvent, or other compatible organic solvents in such amount as to provide a solution containing from approximately 1 to 4% by weight of copper-8-quinolinolate. A ratio of 4 to 5 parts of diluent to 1 part of the above solution has been found to furnish textile treating baths satisfactory for imparting effective fungicidal and preservative properties to textile materials treated therewith in accordance with the present invention.

*Example 2*

28 parts of amyl octyl acid orthophosphate, 11 parts of zinc acetate, and 60 parts of xylene are refluxed in admixture till a clear solution of the reaction materials is obtained. Any water or acetic acid formed during the reaction is removed by azeotropic distillation as the reaction occurs. When a clear solution of the reaction materials has been obtained, heating is discontinued while there are added thereto 5 parts of copper-8-quinolinolate. The mixture is then heated to boiling and held at such temperature till a clear solution of the coppor-8-quinolinolate has been obtained. The solution thus obtained contains approximately 5% by weight of copper-8-quinolinolate.

*Example 3*

17 parts of monoisoamyl acid orthophosphate, 19 parts of copper acetate and 50 parts of xylene are refluxed together as in Examples 1 and 2 till a clear solution of the reaction materials in the xylene has been obtained, the water and acetic acid formed during the reaction being removed by azeotropic distillation. 8.5 parts of copper-8-quinolinolate are then added to the solution which is then heated at its boiling temperature till the copper-8-quinolinolate has completely entered into solution therewith. The resulting solution contains approximately 10.6% by weight of copper-8-quinolinolate.

*Example 4*

30 parts of monodioctyl acid orthophosphate, 9 parts of basic aluminum acetate powder and 50 parts of xylene are refluxed together as in the preceding examples till solution of the reaction materials in the xylene has been obtained. With these materials, the solution obtained is slightly turbid. The solution is then filtered to remove all material which has not completely dissolved, and to the filtrate there are added 4.5 parts of copper-8-quinolinolate. The solution containing the added copper-8-quinolinolate is then heated to boiling and maintained at such temperature till the copper-8-quinolinolate has dissolved completely. To this solution there are then added 30 parts of paraffin wax and heating is continued with agitation until the wax has dissolved completely. Upon cooling to room temperature, the resultant product is a soft, dark green paste containing approximately 3.75% by weight of copper-8-quinolinolate.

A textile treating bath was prepared by diluting the paste product obtained according to Example 4 with Stoddard solvent in the ratio of 47 parts of Stoddard solvent to 53 parts of the said paste product. A sample of cotton duck was padded through the treating bath in such manner as to obtain a 50% wet pick-up of the treating solution and was then dried. The treated fabric was found to contain approximately 1.0% by weight based on the weight of the fabric of copper-8-quinolinolate. Water-repellency tests upon the treated fabric showed a spray rating of 100. Upon leaching the treated fabric in running water for 24 hours followed by burial in the ground for 28 days, no appreciable growth of mildew was apparent nor was there any appreciable loss of tensile strength in the fabric. An untreated sample of the same type of fabric, subjected to the same leaching and soil burial treatment, was found to have deteriorated completely after 6 days burial.

*Example 5*

6 parts of amyl octyl acid orthophosphate, 2.7 parts of nickel acetate and 13.3 parts of xylene are refluxed in admixture till a clear solution of the reaction materials in the xylene has been obtained, the water and acetic acid formed therein being removed from the reaction zone by azeotropic distillation during the course of the reaction. When complete solution of the reaction materials in the solvent has been effected, heating is discontinued while there are added thereto 2.5 parts of copper-8-quinolinolate. The mixture is again heated to boiling and maintained at such temperature till complete solution of the copper-8-quinolinolate has been obtained. The solution thus obtained contains approximately 11% by weight of copper-8-quinolinolate.

A treating solution suitable for the treatment of thread is prepared by diluting the solution obtained in Example 5 with xylene in the ratio of 91 parts of xylene to 9 parts of the said solution. Cotton thread was treated with the diluted treating solution in a package machine, followed by hydroextraction to a wet pick-up of 100% by weight. The treated thread, after drying to remove the volatile solvent, was found to contain approximately 1.0% by weight based on the weight of the thread of copper-8-quinolinolate. The treated thread was found to have lost not more than 5% in tensile strength after soil burial for 14 days.

*Example 6*

30 parts of ethyl lauryl acid orthophosphate, 6 parts of basic aluminum acetate powder and 50 parts of xylene are refluxed together till substantially complete solution of the reactants is secured, the water and acetic acid being removed therefrom as in the preceding examples. A slightly turbid solution is obtained which may be filtered to secure a clean solution of the reaction materials. After filtration, 3.5 parts of copper-8-quinolinolate are added to the clear filtrate and the mixture is heated at boiling temperature till complete solution of the copper-8-quinolinolate has been obtained. This solution contains approximately 4% by weight of copper-8-quinolinolate.

*Example 7*

60 parts of dioctyl acid pyrophosphate, 42.5 parts of nickel acetate and 97.5 parts of xylene are refluxed in admixture till a clear solution of the reaction materials in the xylene is obtained, any water and acetic acid formed as by-products of the reaction being removed therefrom by azeotropic distillation. When a clear solution is obtained, heating is discontinued and 10 parts of copper-8-quinolinolate are added to the solution. The solution containing the added copper-8-quinolinolate is again heated to reflux temperature and kept at such temperature till all of the copper-8-quinolinolate has entered into solution, yielding a solution containing approximately 4.7% by weight of copper-8-quinolinolate.

Instead of utilizing preformed copper-8-quinolinolate in preparing the compositions of the present invention, it is equally satisfactory to employ 8-hydroxyquinoline together with a suitable copper containing compound in correct stoichiometrical amounts so as to form copper-8-quinolinolate in situ in the solution containing a heavy metal salt of the acid phosphates hereinbefore described. Upon heating, a composition containing solubilized copper-8-quinolinolate is obtained.

*Example 8*

300 parts of mono-di-n-octyl acid orthophosphate, 200 parts of nickel acetate and 700 parts of xylol are refluxed together until substantially no further water collects in the azeotropic separator. 120 parts of copper acetate are then added thereto and refluxing is resumed until the collection of water again ceases. 165 parts of 8-hydroxyquinoline are now added to the solution whereupon a greenish precipitate forms which dissolves completely on continued heating. To this solution there are added 550 parts of paraffin wax and 50 parts of zinc stearate and the mixture is stirred with gentle heating until the added materials also enter into solution. On cooling, there is obtained a dark green waxy paste which contains approximately 10% by weight of copper-8-quinolinolate.

A textile treating bath is prepared by warming 20 parts of the paste obtained in Example 8 with 80 parts of Stoddard solvent until a clear solution of the same is obtained. Cotton webbing is padded through the treating bath so as to acquire a wet pick-up of about 50% by weight based on the weight of the said webbing and the treated webbing is then passed over "dry cans" to drive off the volatile solvents contained in the impregnated fabric. The thus treated webbing contains approximately 1.0% by weight of copper-8-quinolinolate, is water-resistant, and is substantially mildew-proof as is evidenced by the fact that it shows a dynamic absorbency of 25% and shows no loss in tensile strength after soil burial for 35 days. The test for the dynamic absorbency of a fabric is described in Federal Specification CCC–T–191b.

As prepared in the illustrative examples set forth above, the solutions containing the solubilized copper-8-quinolinolate are in a more concentrated form than is required for the effective treatment of textile materials and are therefor usually diluted with a suitable organic solvent at the time of the treatment of the fabric in such amounts as to allow the deposition of any desired amount of copper-8-quinolinolate upon the material to be treated. No binder materials need be added to either the treating baths nor to the treated textile materials to insure retention of the fungicidal compositions upon the fibers for, due to the form and manner in which they are employed in the present invention, these materials are substantially completely resistant toward removal thereof from the treated fabrics under substantially all normal conditions of use. This, however, does not preclude the use of resinous binder materials with the compositions of the present invention, particularly in combination with coloring materials such as dyes or pigments, nor does it preclude the use therewith of various textile treating compositions ordinarily employed to impart water-repellency, fire-resistance, etc. to textile materials. The solutions described above may also be employed as components of textile treating emulsions where, for various reasons, it may be preferable to employ an emulsion rather than a solution in the treatment of textiles.

What is claimed is:

1. A composition adapted for the treatment of textile materials to impart fungicidal and preservative properties thereto comprising a substantially neutral solution prepared by mixing a fungicidal amount of copper-8-quinolinolate and a neutral heavy metal salt of a material selected from the group consisting of the monoalkyl and the dialkyl acid esters of orthophosphoric acid and pyrophosphoric acid dissolved in a liquid hydrocarbon solvent therefor, wherein said heavy metal is a metal selected from the group consisting of nickel, zinc, copper, lead, iron, cobalt, manganese and chromium, and said alkyl group contains from 2 to 18 carbon atoms, and heating said mixture at a temperature and for a time sufficient to solubilize said quinolinolate, the amount of said salt being in excess of the amount of said quinolinolate on a weight basis and the amount of said salt being sufficient to solubilize said quinolinolate at the boiling temperature of said solvent, and said solvent being substantially inert to the other ingredients.

2. A composition adapted for the treatment of textile materials to impart fungicidal and preservative properties thereto comprising a substantially neutral solution prepared by mixing a fungicidal amount of copper-8-quinolinolate and a neutral heavy metal salt of amyl octyl acid orthophosphate dissolved in a liquid hydrocarbon solvent therefor, wherein said heavy metal is a metal selected from the group consisting of nickel, zinc, copper, lead, iron, cobalt, manganese and chromium, and heating said mixture at a temperature and for a time sufficient to solubilize said quinolinolate, the amount of said salt being in excess of the amount of said quinolinolate on a weight basis and the amount of said salt being sufficient to solubilize said quinolinolate at the boiling temperature of said solvent, and said solvent being substantially inert to the other ingredients.

3. A composition adapted for the treatment of textile materials to impart fungicidal and preservative properties thereto comprising a substantially neutral solution prepared by mixing a fungicidal amount of copper-8-quinolinolate and the neutral zinc salt of amyl octyl acid orthophosphate dissolved in a liquid hydrocarbon solvent therefor, and heating said mixture at a temperature and for a time sufficient to solubilize said quinolinolate, the amount of said salt being in excess of the amount of said quinolinolate on a weight basis and the amount of said salt being sufficient to solubilize said quinolinolate at the boiling temperature of said solvent, and said solvent being substantially inert to the other ingredients.

4. A composition adapted for the treatment of textile materials to impart fungicidal and preservative properties thereto comprising a substantially neutral solution prepared by mixing a fungicidal amount of copper-8-quinolinolate and a neutral heavy metal salt of monoisoamyl acid orthophosphate dissolved in a liquid hydrocarbon solvent therefor, wherein said heavy metal is a metal selected from the group consisting of nickel, zinc, copper, lead, iron, cobalt, manganese and chromium, and heating said mixture at a temperature and for a time sufficient to solubilize said quinolinolate, the amount of said salt being in excess of the amount of said quinolinolate on a weight basis and the amount of said salt being sufficient to solubilize said quinolinolate at the boiling temperature of said solvent, and said solvent being substantially inert to the other ingredients.

5. A composition adapted for the treatment of textile materials to impart fungicidal and preservative properties thereto comprising a substantially neutral solution prepared by mixing a fungicidal amount of copper-8-quinolinolate and the neutral copper salt of monoisoamyl acid pyrophosphate dissolved in a liquid hydrocarbon solvent therefor, and heating said mixture at a temperature and for a time sufficient to solubilize said quinolinolate, the amount of said salt being in excess of the amount of said quinolinolate on a weight basis and the amount of said salt being sufficient to solubilize said quinolinolate at the boiling temperature of said solvent, and said solvent being substantially inert to the other ingredients.

6. A composition adapted for the treatment of textile materials to impart fungicidal and preservative properties thereto comprising a substantially neutral solution prepared by mixing a fungicidal amount of copper-8-quinolinolate and a neutral heavy metal salt of ethyl lauryl acid orthophosphate dissolved in a liquid hydrocarbon solvent therefor, wherein said heavy metal is a metal selected from the group consisting of nickel, zinc, copper, lead, iron, cobalt, manganese and chromium, and heating said mixture at a temperature and for a time sufficient to solubilize said quinolinolate, the amount of said salt being in excess of the amount of said quinolinolate on a weight basis and the amount of said salt being sufficient to solubilize said quinolinolate at the boiling temperature of said solvent, and said solvent being substantially inert to the other ingredients.

7. A composition adapted for the treatment of textile materials to impart fungicidal and preservative properties thereto comprising a substantially neutral solution prepared by mixing a fungicidal amount of copper-8-quinolinolate and a neutral heavy metal of dioctyl acid pyrophosphate dissolved in a liquid hydrocarbon solvent therefor, wherein said heavy metal is a metal selected from the group consisting of nickel, zinc, copper, lead, iron, cobalt, manganese and chromium, and heating said mixture at a temperature and for a time sufficient to solubilize said quinolinolate, the amount of said salt being in excess of the amount of said quinolinolate on a weight basis and the amount of said salt being sufficient to solubilize said quinolinolate at the boiling temperature of said solvent, and said solvent being substantially inert to the other ingredients.

8. A composition adapted for the treatment of textile materials to impart fungicidal and preservative properties thereto comprising a substantially neutral solution prepared by mixing a fungicidal amount of copper-8-quinolinolate and the neutral nickel salt of dioctyl acid pyrophosphate dissolved in a liquid hydrocarbon solvent therefor, and heating said mixture at a temperature and for a time sufficient to solubilize said quinolinolate, the amount of said salt being in excess of the amount of said quinolinolate on a weight basis and the amount of said salt being sufficient to solubilize said quinolinolate at the boiling temperature of said solvent, and said solvent being substantially inert to the other ingredients.

References Cited in the file of this patent

UNITED STATES PATENTS

| | | |
|---|---|---|
| 1,939,951 | Buchanan et al. | Dec. 19, 1933 |
| 2,381,863 | Benignus | Aug. 15, 1945 |